Figure 1:
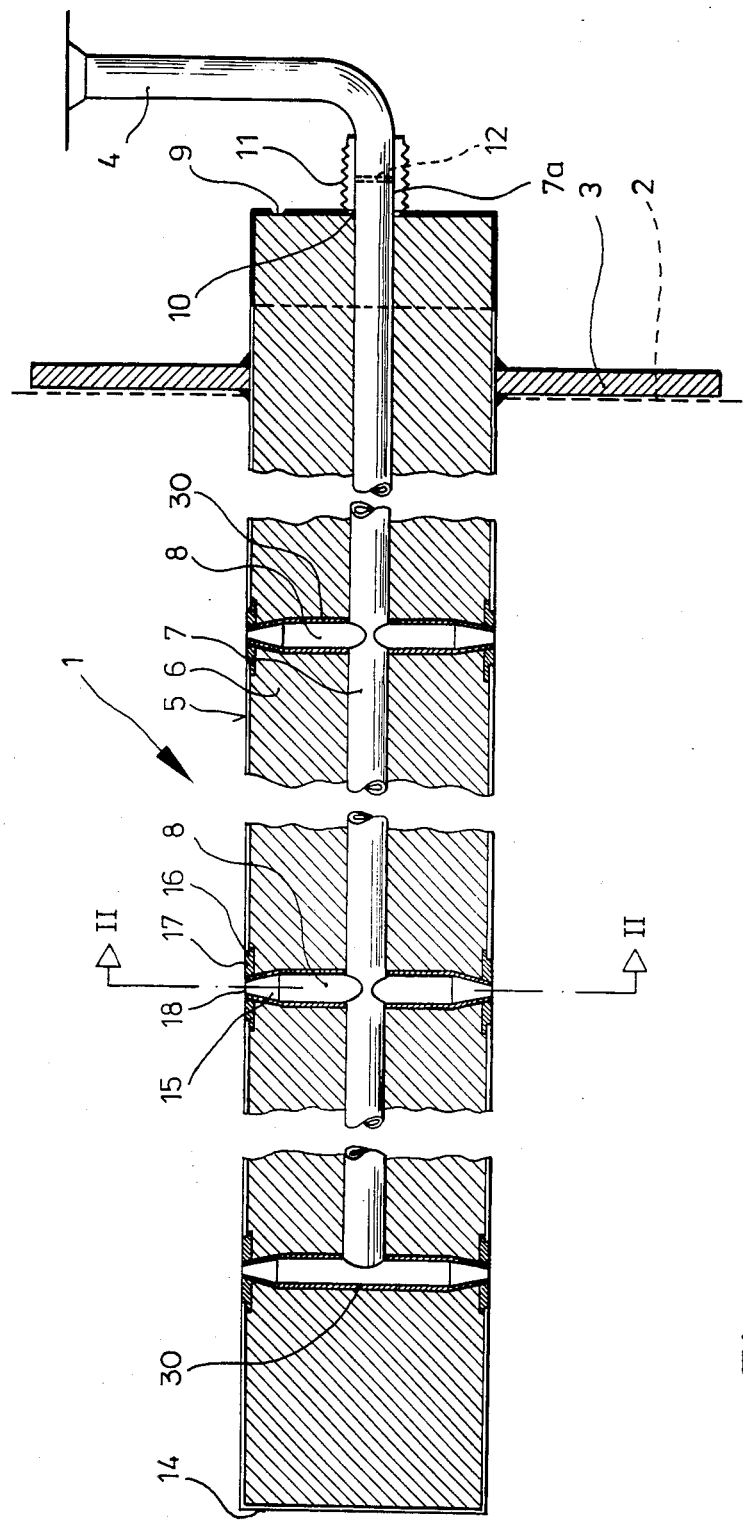

United States Patent [19]

Junkers

[11] Patent Number: 4,573,638
[45] Date of Patent: Mar. 4, 1986

[54] INJECTION PROBE

[75] Inventor: Gerd Junkers, Bad Homburg, Fed. Rep. of Germany

[73] Assignee: Wahlco, Inc., Santa Ana, Calif.

[21] Appl. No.: 621,205

[22] Filed: Jun. 15, 1984

[30] Foreign Application Priority Data

Jun. 22, 1983 [DE] Fed. Rep. of Germany ....... 3322464

[51] Int. Cl.$^4$ .............................................. B05B 1/14
[52] U.S. Cl. .................................. 239/397.5; 239/559; 239/567
[58] Field of Search ..................... 239/397.5, 556–559, 239/565, 567; 55/101, 128, 267, 476; 138/149, 177; 422/168–170, 172, 182, 194

[56] References Cited

U.S. PATENT DOCUMENTS 1,995,790  3/1935  Anderson ............................. 55/128
4,179,071 12/1979  Kozacka ........................... 239/397.5

Primary Examiner—Johnny D. Cherry
Attorney, Agent, or Firm—Howard E. Sandler

[57] ABSTRACT

The invention relates to an injection probe, particularly for the sulfur trioxide conditioning of flue gasses, comprising a tubular, closed-end outer casing, a manifold connected to a feed conduit and provided with radially projecting injector tubes, the ends of which project through openings in the outer casing, being disposed within the casing and at least partially surrounded by an insulating material, and a mounting flange connected to the outer casing for attachment of the injection probe. In a known injection probe of this type, employed for injecting sulfur trioxide at a high temperature into a flue gas stream having a lower temperature, there occur considerable heat losses between the supply inlet end of the injection probe and the ends of the injector tubes, resulting in damage to the injection probe, undesirable sedimentation and unsatisfactory operation. In accordance with the invention, the heat losses can be avoided by reducing the surface of the outlet opening of each injector tube exposed at the outer periphery of the outer casing with respect to the cross-sectional area of the injector tube.

4 Claims, 3 Drawing Figures

INJECTION PROBE

This invention relates to an injection probe of the type utilized for the sulfur trioxide conditioning of the flue gases.

Disclosed in prior art U.S. Pat. No. 4,179,071 is an injection probe of this type, wherein the fastening flange provided for mounting the injection probe within a flue gas channel is connected to the outer casing and with the manifold projecting therefrom by welding. Furthermore the ends of the injector tubes are welded or brazed to the openings of the outer casing, or to bushings slidably guided therein, respectively. This results in the formation of undesirable heat conducting paths wherealong a considerable proportion of the heat supplied by the sulfur trioxide is dissipated. Still further inasmuch as the outlet ends of the injector tubes exposed within the openings of the outer casing and even projecting therebeyond into the flue gas stream, e.g. a calibrated nozzle-plate, have a greater cross-sectional area as the remainder of the longitudinal extent of the injection tubes, a considerable amount of heat is dissipated over this relatively large area. These heat losses result in the formation of sulfuric acid or sulfurous acid by contact of the sulfur trioxide with air, leading to the formation of highly acidic deposits at the junction between the manifold and each injector tube and adjacent the outlet end of each injector tube. It is even possible, that a highly corrosive liquid exits from the outlet ends of the injector tubes, resulting in the formation of substantial deposits around the outlet openings, whereby the flow-through area of the injector tubes is progressively restricted, to result in unsatisfactory operation and finally, failure. These phenomena are due to the relatively low condensation temperature of the sulfur trioxide in air, which lies over 200° C. and is dependent on several factors, so that it cannot be accurately determined. On the other hand, these disadvantages cannot be fully avoided by increasing the temperature at the inlet end of the injection probe, as this temperature depends on the characteristics of preceeding processes and other factors.

It is an object of the present invention to provide an injection probe of the type set forth in the introduction as well as a method for making same, wherein unduly high heat losses are to be avoided.

As the outlet ends of the injector tubes are extremely reduced in their contact surfaces and moreover present an extremely small surface area to the cooler environment of the injection probe, undesirable heat losses are effectively reduced. A desirably high temperature level is maintained over the whole extent of each injector tube. As a result of this construction, the occurring heat losses are reduced to about 30 percent of those accepted in known designs. This results in trouble-free operation of the injection probe also in the case of varying sulfur trioxide injection rates, and in a passive protection of the injection probe against corrosion, as any acid condensation within the injection probe is substantially avoided.

Not only does the outlet nozzle of the present invention include a desirably small cross-sectional area, from which only little heat is dissipated, but the confirmation has the additional effect that the flow of the sulfur trioxide-air mixture is rectified, resulting in an increased efficiency of the injection probe and in a reduced danger of deposits forming at these locations.

Further advantages of the present invention are apparent, as the gradual reduction of the wall thickness results in the outlet opening of the nozzle forming an extremely narrow annulus capable of dissipating only very small amounts of heat.

With regard to manufacturing techniques, advantages are also offered, as such injector tubes may be readily formed to this heat losses reducing shape by drawing, cold forming or machining.

Alternative embodiments are available in which the outlet nozzles may be prefabricated to highly accurate shapes and dimensions to result in an optimum jet effect for the gas mixture flow.

A calculated surface area ratio, has been found particularly effective. This ratio depends on the desired flow-through rate and the desirably small outlet opening area exposed to the cooler environment on the other.

In the known injection probe, the injector tubes are connected to the manifold by means of flange connectors. Such flange connections result in the formation of strong turbulence within the gas mixture stream, whereby the danger of deposits forming due to the influence of the erratic flow is greatly increased. It has also been found in practical operation of the known injection probe that corrosive deposits occur at an increased rate adjacent the junction between the manifold and the injector tube. According to the invention, this is avoided in a particularly simple manner, as the junctions formed as intersections between two tubular members are apt to create a smooth flow configuration. These junctions can additionally be formed very strong and absolutely impermeable, which is of considerable importance, as any bending loads on the injector tubes are smoothly absorbed and transmitted to the manifold without the occurrence of local stress concentrations. in a construction as described herein, the large-area and thick-walled mounting flange can no longer dissipate heat from the manifold, even if it is strongly cooled by the flue gasses flowing therearound. Since also the outlet ends of the injector tubes are not in heat conducting contact with the outer casing and present only a small surface to the cooler environment, undesirable heat losses are effectively avoided. The outlet nozzle is shielded by the insulating lining, so that it does not enter into heat transmitting contact with the outer casing. Moreover, the relative displacements between the injector tubes and the outer casing caused by differential thermal expansion does not take effect between these two members directly, but in an indirect manner through the insulating lining, which may be readily disposed in such a manner that it acts as a flexible mounting for the outlet nozzle. In the practical design it has been found expedient to select a ratio of about 1:25 between the area of the nozzle outlet and the area of the opening of the outer casing.

A further advantage of the present invention reside in providing that, as there are no projecting portions of the injector tubes which would be exposed to the cooler flue gas stream, so that the outflowing sulfur trioxide is readily dispersed in the flue gas stream. The respective areas also remain free of dust deposits, which might otherwise adversely affect the efficiency of the injection probe.

An additional modification of the present invention includes the use of a low thermal conductivity material as, the insulation of the outlet nozzle which is fitted into the opening of the outer casing for receiving the outlet nozzle therein. This insert may likewise be designed in a simple manner so as to permit a desirable relative movement to take place between the outlet nozzle and the outer casing, such relative movement being possibly required to accommodate differential heat expansion of the outer casing and the manifold, respectively.

A further design of the outer casing permits the manufacture and assembly of the injection probe to be substantially simplified as compared to the case of a purely tubular configuration as employed in prior art. The disclosed design permits the trough to be initially filled with the insulating mass up to the level of the manifold prior to the latter being laid down and aligned within the outer casing. Subsequently the trough may be filled with the insulating mass up to its upper rim, whereupon the lid is put on. The disclosed shape of the outer casing results in a smooth flow therearound in an arrangement, in which the injection probe extends transversely through the flue gas channel. In addition, a gradually thickening dust layer is deposited on the plane lid of the outer casing, to result in a further improved insulating effect. The outlet openings of the injector tubes or nozzles, respectively, are then arranged transversely of the direction of flow in the flue gas stream, so that the sulfur trioxide is uniformly distributed in the flue gas stream, which is important with regard to the desired flue gas conditioning.

In prior art arrangements, the fastening flange was integrally connected to the outer casing as well as to the manifold located therein, resulting not only in the formation or undesirable thermally conductive paths, but also in local stress concentrations adjacent the respective connections on the occurrence of relative displacements between the outer casing and the manifold due to differential thermal expansion. As the fastening flange is now affixed only to the outer casing, which acts as the carrying part of the injection probe, any heat transfer from the manifold to the flange is safely precluded, as is the occurrence of local stress concentrations. A further advantage resides in the circumstance that the end portion of the outer casing projecting rearwards beyond the fastening flange, together with the insulating material contained therein, ensures an effective insulation of the inlet end of the manifold, such insulation being located outside of the flue gas channel and thus in an environment in which lower temperatures usually prevail.

As the pressure within the flue gas channel is usually lower than that outside thereof, the end portion of the injection probe projecting outside of the flue channel has to be hermetically sealed in order to prevent atmospheric air from being sucked into the outer casing. This may be accomplished in a simple manner in which the compensator piece offers the advantage that it is effective not only to ensure the gas-tight closure of the location whereat the manifold projects out of the outer casing, but also to compensate the differential thermal expansion of these two members, whereby dangerous stress concentrations are avoided. This arrangement also avoids any direct heat-transmitting contact between the end closure of the outer casing and the manifold.

A further advantageous embodiment comprises a plurality of pairs of injector tubes distributed along the length of the injection probe. In this embodiment, the unavoidable relative movements due to differential thermal expansion are taken account of by anchoring the manifold with its center pair of injector tubes in the insulating material, while the injector tubes adjacent the two ends of the injection probe retain a certain freedom of movement within the insulating material, while being perfectly heat-insulated.

Figure 3:
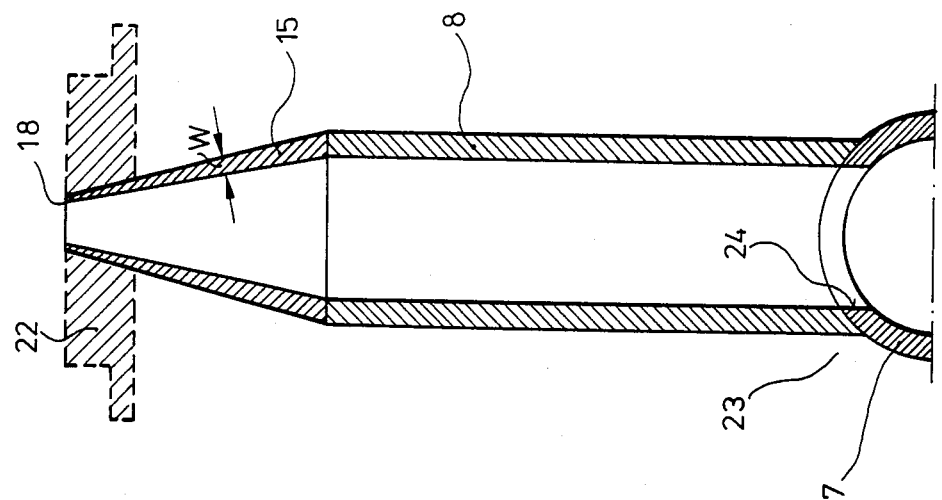
Figure 2:
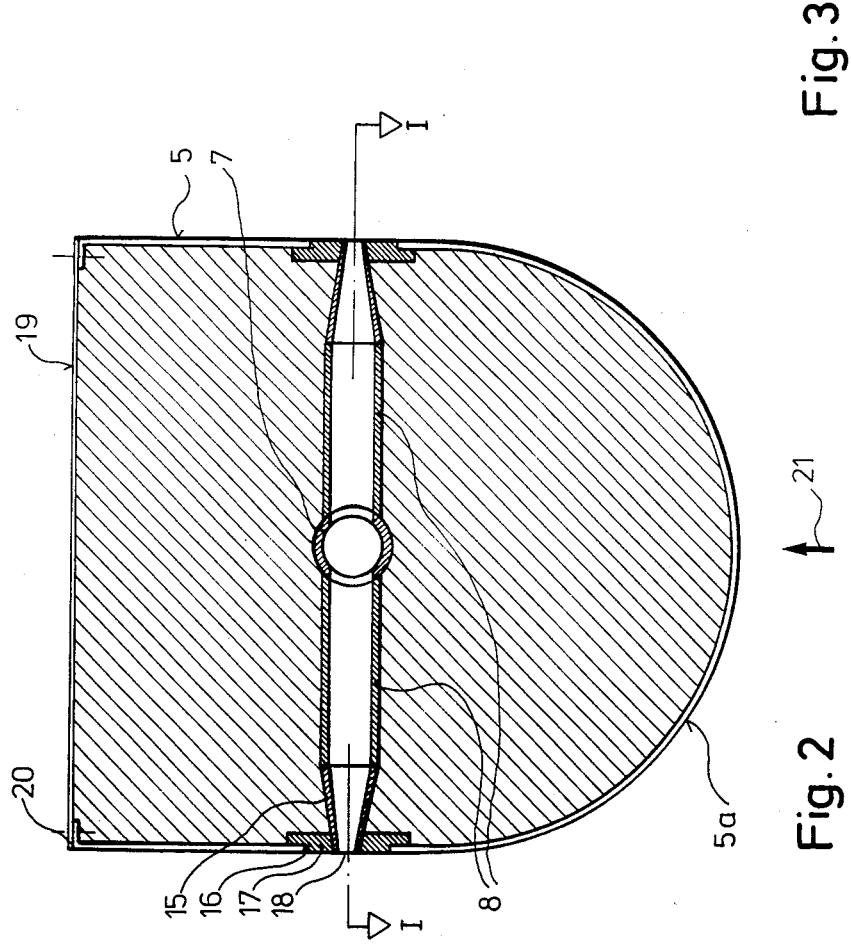

A preferred movement of the invention shall now be described with reference to the accompanying drawings, wherein:

FIG. 1 shows a longitudinal sectional view of an injection probe according to the invention, taken in the plane I—I of FIG. 2, FIG. 2 shows an enlarged cross-sectional view of the injection probe taken along the line II—II in FIG. 1, and FIG. 3 shows a detail of the embodiment shown in FIGS. 1 and 2.

In the combustion of coal, the resulting flue gases contain fly ash, which is separated therefrom as by means of electrostatic separators in the case of industrial coal-fueled plants. Effective operation of electrostatic separators requires the fly ash to have a certain electric resistivity. Sulfur trioxide produced by the combustion combines with moisture contained in the flue gases to form sulfuric acid which condenses on the fly ash particles, whereby the electric resistivity thereof is determined. This acid condensation for many types of coal is not sufficient, however, for the effective operation of the electrostatic separators, wherefore one resorts to the sulfur trioxide flue gas conditioning, i.e to a method in which additional sulfur trioxide is introduced into the flue gases. This is done for instance with the aid of injection probes supplied with a sulfur trioxide-air mixture at a high temperature level, which mixture is injected into the flue gas stream, the latter being at a noticably lower temperature than the sulfur trioxide-air mixture.

Shown in FIGS. 1 and 2 is an injection probe 1 for the sulfur trioxide conditioning of flue gases, such probe 1 being inserted into a flue gas channel from the exterior thereof and attached to a wall 2 of the channel by means of a mounting flange 3. Exteriorly of the flue gas channel injection probe 1 is connected to a supply conduit 4 for the supply of a sulfur trioxide-air mixture.

Injection probe 1 has an outer casing 5, preferably made of a corrosion-resistant steel sheet, comprising a trough of substantially U-shaped cross-sectional configuration having front and rear end walls 9 and 14, and a substantially planer lid 19 attached to the top of the trough (FIG. 2). Outer casing 5 contains an insulating material 6, preferably insulating concrete, and a longitudinally extending manifold 7 having an end portion 7a projecting from the outer casing 5 and connected to supply conduit 4.

As shown in FIG. 2, manifold 7 is located substantially at the center of gravity of the cross-section of outer casing 5, i.e. slightly above the half of its height. Pairs of coaxial injector tubes 8 extend from manifold 7 substantially parallel to lid 19. Injection probe 1 contains e.g., three longitudinally spaced pairs of injector tubes 8, the central one of which is solidly imbedded in insulating material 6. If desired, the injector tubes 8 adjacent the end walls 9 and 14 of injection probe 1 provided for accommodating limited relative movements of the respective injector tubes 8 due to thermally induced length variations of manifold 7.

Each injector tube 8 is connected to manifold 7 in an intersecting configuration 23 (FIG. 3), preferably by welding or brazing. To this effect, the wall of manifold 7 is formed with openings 24, the size and configuration of which corresponds to the internal cross-section of the injector tubes 8, so as to achieve a smooth and efficient transition from manifold 7 to each injector tube 8.

In the embodiment shown, each injector tube 8 carries a outlet nozzle 15 of generally conical shape at its outer end. The wall thickness of the outlet nozzle is gradually reduced from its connection to injector tube 8 towards the oppositely located outlet opening 18, so that the surface area of the latter is substantially smaller than the cross-sectional area of injector tube 8 or of the connected portion of nozzle 15. The wall thickness of nozzle 15 is indicated as w.

The outlet opening 18 of nozzle 15 is flush with the outer periphery of outer casing 5. Adjacent each nozzle 15, outer casing 5 is formed with an opening 16 surrounding outlet opening 18 of nozzle 15 at a considerable radial spacing. Each opening 16 is lined with a refractory cement or with a low thermal conductivity mass 17 extending to some distance under the outer casing 5.

FIG. 3 shows an alternative arrangement in broken lines. In this embodiment, an insert 22 of low heat-conductivity material such as glass, porcellain, ceramics or the like is inserted into opening 16 from the inside of casing 5, with the point of nozzle 15 being received therein, so that its outlet opening 18 is safely supported and thermally insulated with respect to the outer casing. It would also be possible to form the nozzle 15 itself of a low thermal-conductivity material, so as to avoid the occurrence of heat losses in this portion which is exposed to the cooler environment.

FIG. 2 shows the arrangement of injection probe 1 with its convexely rounded bottom surface facing towards the flue gas stream indicated by arrow 21. In this manner, an ash or dust layer acting as an additional thermal insulation is deposited on lid 19. Lid 19 may be attached to the trough as by welding or brazing. Alternatively, lid 19 may also be bolted to the trough as indicated at 20, so that the interior of the outer casing is readily accessible for repair works or for inserting and removing of temperature sensors without having to destroy the outer casing.

In a practical embodiment of the injection probe 1 as shown in FIGS. 1 to 3, the manifold has an interior diameter of 21.6 mm, while injector tubes 8 have an interior diameter of 16 mm. The wall thickness of injector tubes 8 is about 2.6 mm, while the wall thickness w of nozzle 15 amounts to about 0.5 mm adjacent outlet opening 18. The interior diameter of outlet opening 18 is only 5 mm, as compared to the interior diameter of 16 mm of the injector tube. This means that there is a relationship of approximately 1:13 between the surface area of the outlet opening, which is exposed to the cooler environment, and the total cross-sectional area of injector tube 8. The length of outlet nozzle 15 equals about one half of the length of the cylindrical injector tube 8, which together with the conical shape of the outlet nozzle results in a desirable refraction of the injection stream. Furthermore, the relationship between the outlet opening surface area and the size of opening 16 amounts to approximately 1:25, to thereby achieve not only a certain freedom of movement of the nozzle within the opening, but also a reliable thermal insulation between these two elements. Furthermore, the inlet end portion of outer casing 5 between flange 3 and supply conduit 4 may be made of a thinner sheet material than the portion lying within the flue gas channel (1.0 mm and 0.5 mm, respectively). In addition, the inner end of the injection probe is preferably supported by suitable support means (not shown) within the flue gas channel, in order to avoid that the location whereat flange 3 is affixed to outer casing 5 is subjected to excessive stresses, which would otherwise have to be expected in view of the length of the injection probe of about 2.2/m.

The injection probe shown is designed for being mounted in the flue gas channel transversely of the direction of the flue gas stream. It is of course also possible to mount it parallel to the flow direction, in which case the additional effect of the insulating layer on lid 19 would not materialize. It would further be possible to design the cross-sectional configuration of the outer casing with a stronger emphasis on aerodynamic viewpoints and to locate the outlet openings of the nozzles in such areas whereat optimum injection of the sulfur trioxide into the flue gases is ensured.

It is further important that the end portion of the outer casing extending to the rear of the fastening flange including the compensation piece be sealed in an absolutely gas-tight manner, in order to prevent atmospheric air from being sucked into the injection probe by the partial vacuum usually present in a flue gas channel or at the inlet of an electrostatic separator, respectively, as this would entail additional heat losses. The number of injector tubes distributed over the length of the injection probe is not critical. It is only advisable that the injector tubes located closest to the longitudinal center of the probe be securely anchored in the insulating material, while the remaining injector tubes located more closely to the ends of the injection probe are imbedded in the insulating material with the employ of further pliable insulation means.

Manufacture of the above described injection probe is initiated by forming an upwardly open sheet metal trough with openings 16. This trough is then filled with insulating concrete up to the level provided for the installation of manifold 7, whereupon the concrete is compacted by stamping or in any other suitable manner. Subsequently, the manifold with its injector tubes is laid down on the resulting support surface of the concrete, and positioned in such a manner that the outlet openings of the nozzles are accurately aligned with the centers of openings 16. At this point, inserts 22 or liners 17 may be inserted as required. Thereafter further insulating concrete is poured and compacted, so that the manifold is retained in its aligned position and the outer casing trough is completely filled with a homogenous mass of insulating concrete. Subsequently lid 19 is put on, whereupon mounting flange 3 is welded to the outer casing. The end of manifold 7 projecting from outer casing 5 is then welded to supply conduit 4 interior of compensator piece 11, before the latter is connected to end wall 9 on the one hand and to manifold 7 or supply conduit 4, respectively, in such a manner as to ensure the absolutely gas-tight sealing of this end portion of the injection probe. If the liners 17 have not yet been inserted at an earlier time, they can now be so inserted. The manifold with its injector tubes is prefabricated to form an integral structural unit which may already be provided with the additional insulations 30.

I claim:

1. In an injection probe, particularly for the sulfur trioxide conditioning of flue gas of a type which includes a tubular, closed-end outer casing, a manifold connected to an elongated feed conduit provided with elongated injector tubes which, project radially outwardly from the longitudinal axis of such feed conduit through openings in the outer casing, have outer outlet openings adjacent respective openings in such casing and which injector tubes are at least partially surrounded by an insulating material, the improvement comprising: said outlet openings are reduced in cross-sectional area with respect to the inner periphery of said injector tubes axially inwardly therefrom; the outer end of each injector tube is formed with an outlet nozzle of conically convergent shape in the flow direction; and the outer periphery of each nozzle which is adjacent said openings in said casing is spaced therefrom and a refractory adhesive material is disposed therebetween.

2. An injection probe as is specified in claim 1 wherein said outlet openings of said injector tubes are flush with adjacent portions of the outer periphery of said casing.

3. In an injection probe, particularly for the sulfur trioxide conditioning of flue gas of a type which includes a tubular, closed-end outer casing, a manifold connected to an elongated feed conduit provided with elongated injector tubes which, project radially outwardly from the longitudinal axis of such feed conduit through openings in the outer casing, have outer outlet openings adjacent respective openings in such casing, and which injector tubes are at least partially surrounded by an insulating material, the improvement comprising: said outlet openings are reduced in cross-sectional area with respect to the inner periphery of said injector tubes axially inwardly therefrom; the outer end of each injector tube is formed with an outlet nozzle of conically convergent shape in the flow direction; and an annular insert of low thermal conductivity material is positioned within each of said openings in said casing and said outlet nozzle is received therein.

4. In an injection probe, particularly for the sulfur trioxide conditioning of flue gas of a type which includes a tubular, closed-end outer casing, a manifold connected to an elongated feed conduit provided with elongated injector tubes which, project radially outwardly from the longitudinal axis of such feed conduit through openings in the outer casing, have outer outlet openings adjacent respective openings in such casing and which injector tubes are at least partially surrounded by an insulating material, the improvement comprising: said outlet openings are reduced in cross-sectional area with respect to the inner periphery of said injector tubes axially inwardly therefrom; the outer end of each injector tube is formed with an outlet nozzle of conically convergent shape in the flow direction; and at least some of said injector tubes, and the respective outlet nozzles therefor, are embedded in a pliable thermal insulation.

* * * * *